US008988736B2

(12) United States Patent
Kowaka

(10) Patent No.: US 8,988,736 B2
(45) Date of Patent: Mar. 24, 2015

(54) IMAGE FORMING APPARATUS THAT EXECUTES IMAGE-QUALITY ADJUSTMENT

(71) Applicant: Kyocera Document Solutions Inc., Osaka (JP)

(72) Inventor: Makoto Kowaka, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/109,243

(22) Filed: Dec. 17, 2013

(65) Prior Publication Data

US 2014/0168713 A1 Jun. 19, 2014

(30) Foreign Application Priority Data

Dec. 19, 2012 (JP) ................................. 2012-277033

(51) Int. Cl.
*G06K 15/02* (2006.01)
*G03G 15/00* (2006.01)
*G03G 21/14* (2006.01)
*H04N 1/00* (2006.01)

(52) U.S. Cl.
CPC ............ *G06K 15/1872* (2013.01); *G03G 15/00* (2013.01); *G03G 21/14* (2013.01); *H04N 1/00* (2013.01)
USPC ............................... 358/3.27; 399/81; 399/83

(58) Field of Classification Search
CPC .......... H04N 1/00474; H04N 1/00482; H04N 1/00411; H04N 2201/0094; H04N 1/00466
USPC ....................................... 358/3.27; 399/81, 83
See application file for complete search history.

(56) References Cited

U.S. PATENT DOCUMENTS 7,221,885 B2 * 5/2007 Sato ............................... 399/81

FOREIGN PATENT DOCUMENTS

JP 2011140231 7/2011

* cited by examiner

*Primary Examiner* — Charlotte M Baker
(74) *Attorney, Agent, or Firm* — K&L Gates LLP

(57) ABSTRACT

An image forming apparatus includes: a job receiving unit that receives a job for executing printing; an image-quality-adjustment execution unit that executes a normal image-quality adjustment at an image-quality adjustment time and a prior image-quality adjustment before the image-quality adjustment time; an image-quality-setting receiving unit that receives an image-quality setting; a reply request unit that, within a specific state before the image-quality adjustment time since the job is received by the job receiving unit, requests a reply indicating whether to execute a prior image-quality adjustment if a specific condition for the reception of the image-quality setting is satisfied; and a printing execution unit that, if the reply indicates that the prior image-quality adjustment is to be executed, prints an image on a recording medium by executing the job after the image-quality-adjustment execution unit executes the prior image-quality adjustment.

10 Claims, 13 Drawing Sheets

IMAGE FORMING APPARATUS THAT EXECUTES IMAGE-QUALITY ADJUSTMENT

INCORPORATION BY REFERENCE

This application is based upon and claims the benefit of priority from the corresponding Japanese Patent Application No. 2012-277033, filed in the Japan Patent Office on Dec. 19, 2012, the entire contents of which are incorporated herein by reference.

FIELD

The present disclosure relates to an image forming apparatus that adjusts the quality of an image and prints the image on a recording medium.

BACKGROUND

A typical image forming apparatus can execute printing of an image on a recording medium and image-quality adjustment for maintaining the image quality of the printing. Upon receiving a printing execution job, a typical image forming apparatus can execute the job after performing an image-quality adjustment, provided that the number of sheets printed after a previous image-quality adjustment has reached a specific number or that the time elapsed from the previous image-quality adjustment has reached a specific reference value.

However, a typical image forming apparatus uniformly executes an image-quality adjustment irrespective of users when the image forming apparatus is in a specific state. Thus, even if the time when an image-quality adjustment is executed is appropriate for a user who places standard importance on image quality, the time when the adjustment is executed is sometimes too late for a user who places greater importance on image quality.

SUMMARY

An image forming apparatus according to an embodiment of the present disclosure includes a job receiving unit, an image-quality-adjustment execution unit, an image-quality-setting receiving unit, a reply request unit, and a printing execution unit. The job receiving unit is configured to receive a job for executing printing. The image-quality-adjustment execution unit is configured to execute a normal image-quality adjustment at an image-quality adjustment time and a prior image-quality adjustment before the image-quality adjustment time, for maintaining the image quality of the printing. The image-quality-setting receiving unit is configured to receive an image-quality setting for the image quality. The reply request unit is configured, in a specific state before the image-quality adjustment time since the job is received by the job receiving unit, to request a reply indicating whether to execute a prior image-quality adjustment if a specific condition for the reception of the image-quality setting by the image-quality-setting receiving unit is satisfied. The printing execution unit is configured, if the reply indicates that the prior image-quality adjustment is to be executed, to print an image on a recording medium by executing the job after the image-quality-adjustment execution unit executes the prior image-quality adjustment.

A method for forming an image according to an embodiment of the present disclosure includes: (i) receiving, via a job receiving unit, a job for executing printing; (ii) executing, via an image-quality-adjustment execution unit, a normal image-quality adjustment at an image-quality adjustment time and a prior image-quality adjustment before the image-quality adjustment time, for maintaining the image quality of the printing; (iii) receiving, via a quality image-quality-setting receiving unit, an image-quality setting for the image quality; (iv) in a specific state before the image-quality adjustment time since the job is received by the job receiving unit, requesting, via a reply request unit, a reply indicating whether to execute a prior image-quality adjustment if a specific condition for the reception of the image-quality setting by the image-quality-setting receiving unit is satisfied; and (v) if the reply indicates that the prior image-quality adjustment is to be executed, printing, via a printing execution unit, an image on a recording medium by executing the job after the image-quality-adjustment execution unit executes the prior image-quality adjustment.

A non-transitory, computer-readable recording medium is provided according to an embodiment of the present disclosure that stores an image forming program that is executable by a computer of an image forming apparatus. The image forming program includes first to fifth program codes. The first program code causes the computer to receive a job for executing printing. The second program code causes the computer to execute a normal image-quality adjustment at an image-quality adjustment time and a prior image-quality adjustment before the image-quality adjustment time, for maintaining the image quality of the printing. The third program code causes the computer to receive an image-quality setting for the image quality. The fourth program code causes the computer, in a specific state before the image-quality adjustment time since the job is received, to request a reply indicating whether to execute a prior image-quality adjustment if a specific condition for the reception of the image-quality setting is satisfied. The fifth program code causes the computer, if the reply indicates that the prior image-quality adjustment is to be executed, to print an image on a recording medium by executing the job after the image-quality-adjustment execution unit executes the prior image-quality adjustment.

Additional features and advantages are described herein, and will be apparent from the following Detailed Description and the figures.

DETAILED DESCRIPTION

Embodiments of the present disclosure will be described hereinbelow with reference to the drawings.

First, the configuration of an image forming system according to an embodiment will be described.

Figure 1:
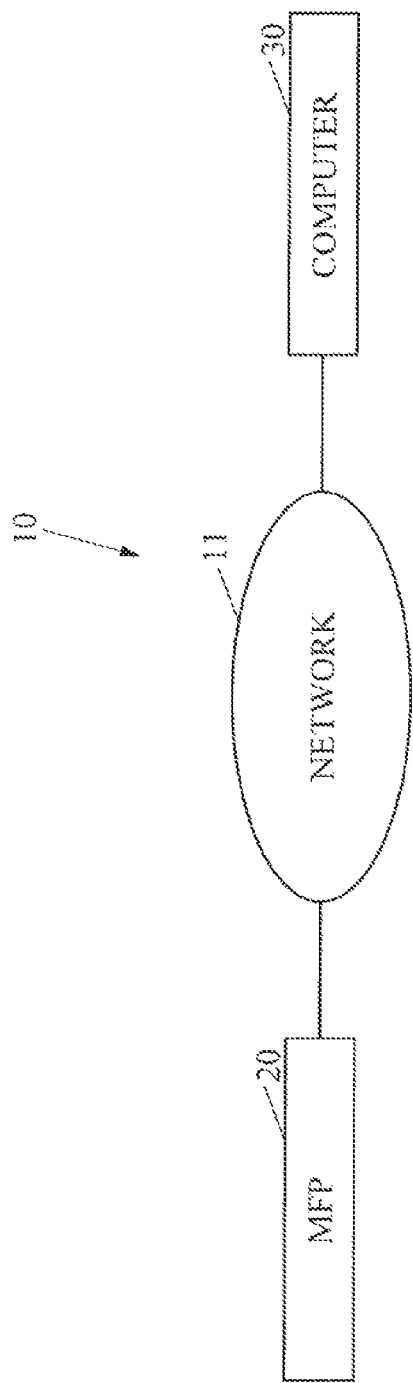
FIG. 1 shows the configuration of an image forming system according to an embodiment of the present disclosure.

FIG. 1 shows the configuration of an image forming system 10 according to an embodiment of the present disclosure.

As shown in FIG. 1, the image forming system 10 includes a multifunction peripheral (MFP) 20 serving as an image forming apparatus according to the embodiment of the present disclosure and a computer 30 that can transmit print data to the MFP 20. The MFP 20 and the computer 30 are connected so as to communicate with each other via a network 11, such as a local area network (LAN) and the Internet.

Figure 2:
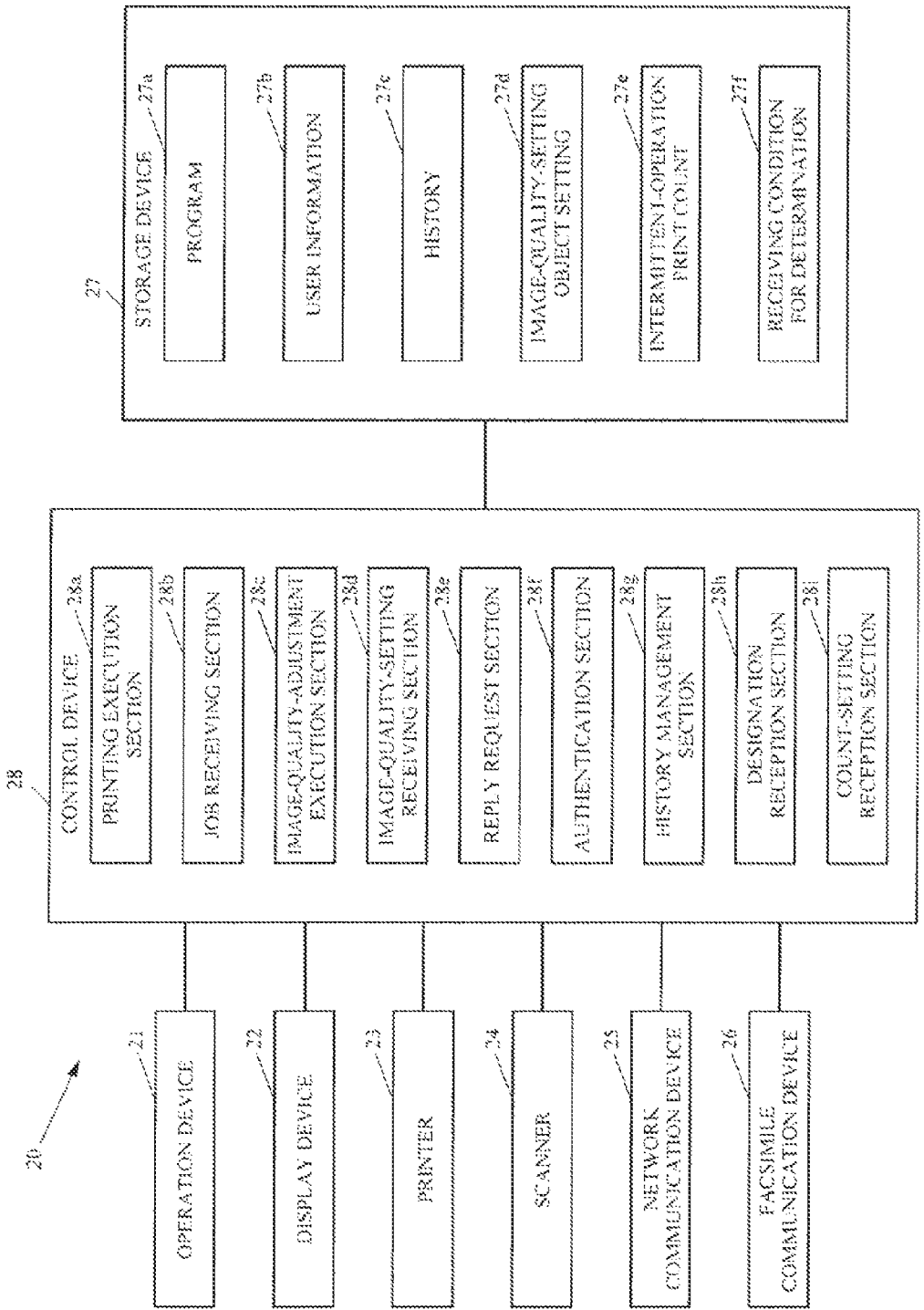
FIG. 2 shows the configuration of an MFP in FIG. 1.

FIG. 2 shows the configuration of the MFP 20.

As shown in FIG. 2, the MFP 20 includes an operation device 21 having an input element, such as a button, via which user's operations are inputted; a display device 22 having a display element, such as a liquid crystal display (LCD), that displays items of information; a printer 23 executing printing on a recording medium, such as paper; a scanner 24 reading an image from a document; a network communication device 25 communicating with an external device, such as the computer 30 (see FIG. 1), via the network 11 (see FIG. 1); a facsimile communication device 26 performing facsimile communication with an external fax machine (not shown) via a communication line, such as a public telephone line; a storage device 27 having a storage element, such as an electrically erasable programmable read only memory (EEPROM) and a hard disk drive (HDD), capable of storing information; and a control device 28 that controls the entire MFP 20.

The operation device 21 may include an input element that forms a touch panel together with the display device 22.

The storage device 27 stores a program 27a for the image forming apparatus (hereinafter referred to as an image forming apparatus program). The image forming apparatus program 27a may be installed in the MFP 20 during an MFP 20 manufacturing stage. The image forming apparatus program 27a may also be installed into the MFP 20 from a storage medium, such as an SD card and a universal serial bus (USB) memory, or via the network.

The storage device 27 can store user information 27b for authenticating users. The user information 27b includes an ID and a password for each user.

The storage device 27 can store the history 27c of received settings relating to the image quality of printing (hereinafter referred to as an image-quality-setting reception history); an image-quality-setting object setting 27d for designating the object of an image-quality setting among settings on the MFP 20; the intermittent-operation print count 27e (hereinafter referred to as an intermittent-operation print count); and a receiving condition for determination 27f as a specific condition on reception of the image-quality setting for determining whether to request a reply indicating whether to execute a prior image-quality adjustment. During an intermittent operation, a specific number of sheets are printed without executing the prior image-quality adjustment as an image-quality adjustment before an image-quality adjustment time to execute the normal image-quality adjustment.

The control device 28 includes, for example, a central processing unit (CPU), a read only memory (ROM) that stores programs and data, and a random access memory (RAM) for use as a working area of the CPU. The CPU executes the programs stored in the ROM or the storage device 27.

The control device 28 functions as: a printing execution section 28a that executes printing of an image on a recording medium with the printer 23 by executing the image forming apparatus program 27a stored in the storage device 27; a job receiving section 28b that receives a job for causing the printing execution section 28a to execute printing; an image-quality-adjustment execution section 28c that executes an image-quality adjustment for maintaining the image quality of printing performed by the printing execution section 28a; an image-quality-setting receiving section 28d that receives the image-quality setting on the image quality of printing performed by the printing execution section 28a; a reply request section 28e that requests a reply indicating whether to execute a prior image-quality adjustment; an authentication section 28f that authenticates the user; a history management section 28g that manages the image-quality-setting reception history 27c of the image-quality-setting receiving section 28d for the individual users; a designation reception section 28h that receives the image-quality-setting object setting 27d for designating the object of the image-quality setting among settings on the MFP 20; and a count-setting reception section 28i that receives a setting on the intermittent-operation print count 27e.

The image-quality adjustment, including the normal and the prior image-quality adjustments, is executed to maintain the appropriate print quality of the MFP 20. Examples of the image-quality adjustment executed by the image-quality-adjustment execution section 28c include hardware adjustment of the MFP 20, such as drum refreshing for removing toner that adheres to a photosensitive drum (not shown) of the printer 23 and cleaning of a charger (not shown) for charging the photosensitive drum, and software adjustment of the MFP 20, such as adjustment of the density of printing with the printer 23.

Figure 3:
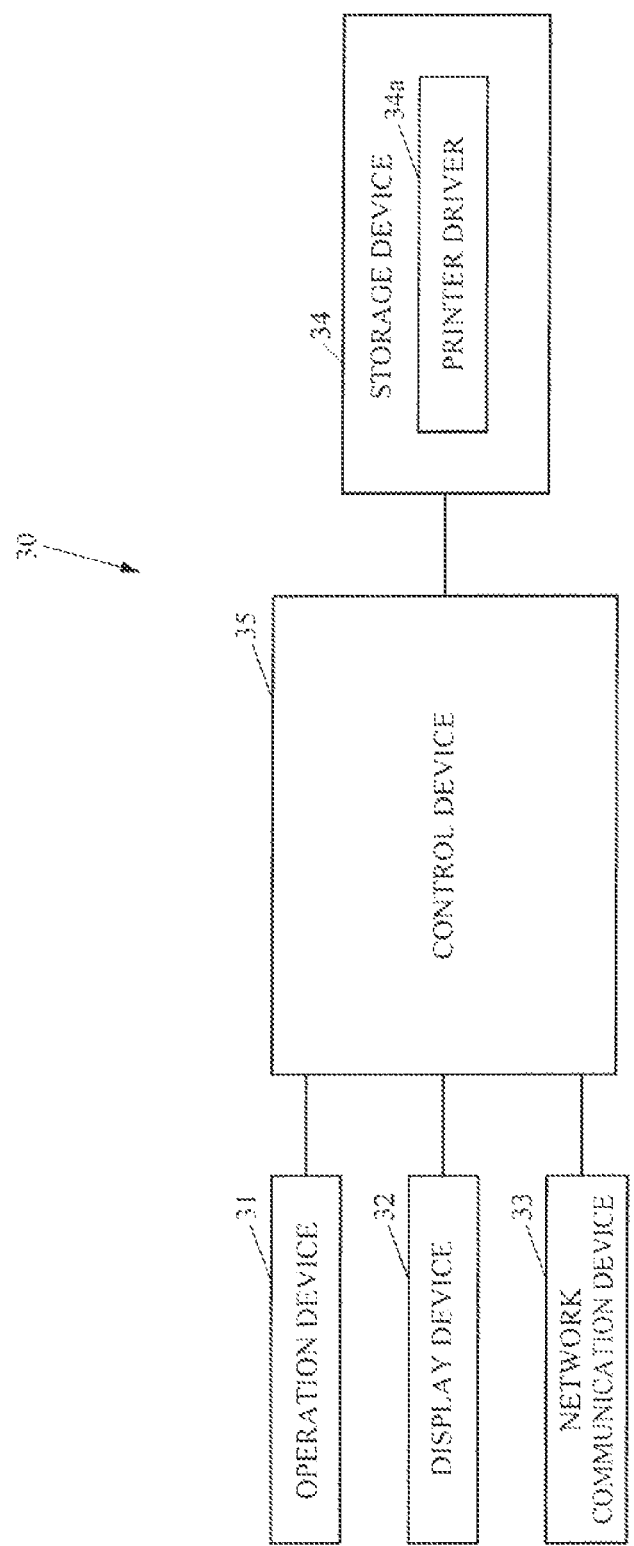
FIG. 3 shows the configuration of a computer in FIG. 1.

FIG. 3 shows the configuration of the computer 30.

As shown in FIG. 3, the computer 30 includes an operation device 31 having an input element, such as a mouse and a keyboard, via which operations are inputted; a display device 32 having a display element, such as an LCD, for displaying information; a network communication device 33 communicating with an external device, such as the MFP 20 (see FIG. 1), via the network 11 (see FIG. 1); a storage device 34 having a non-volatile storage element, such as a HDD, that stores programs and data; and a control device 35 that controls the entire computer 30. The computer 30 comprises an information processing element, such as a personal computer (PC).

The storage device 34 includes a printer driver 34a for controlling the MFP 20. The printer driver 34a may be installed in the computer 30 during a computer 30 manufacturing stage. The printer driver 34a may also be installed into the computer 30 from a storage medium, such as a compact disk (CD) and a digital versatile disk (DVD), or via the network 11.

The control device 35 includes, for example, a CPU, a ROM that stores programs and data, and a RAM for use as a working area of the CPU. The CPU executes the programs stored in the ROM or the storage device 34.

Next, the operation of the MFP 20 will be described.

First, an operation of the MFP 20 for performing the image-quality-setting object setting 27d will be described.

Figure 4:
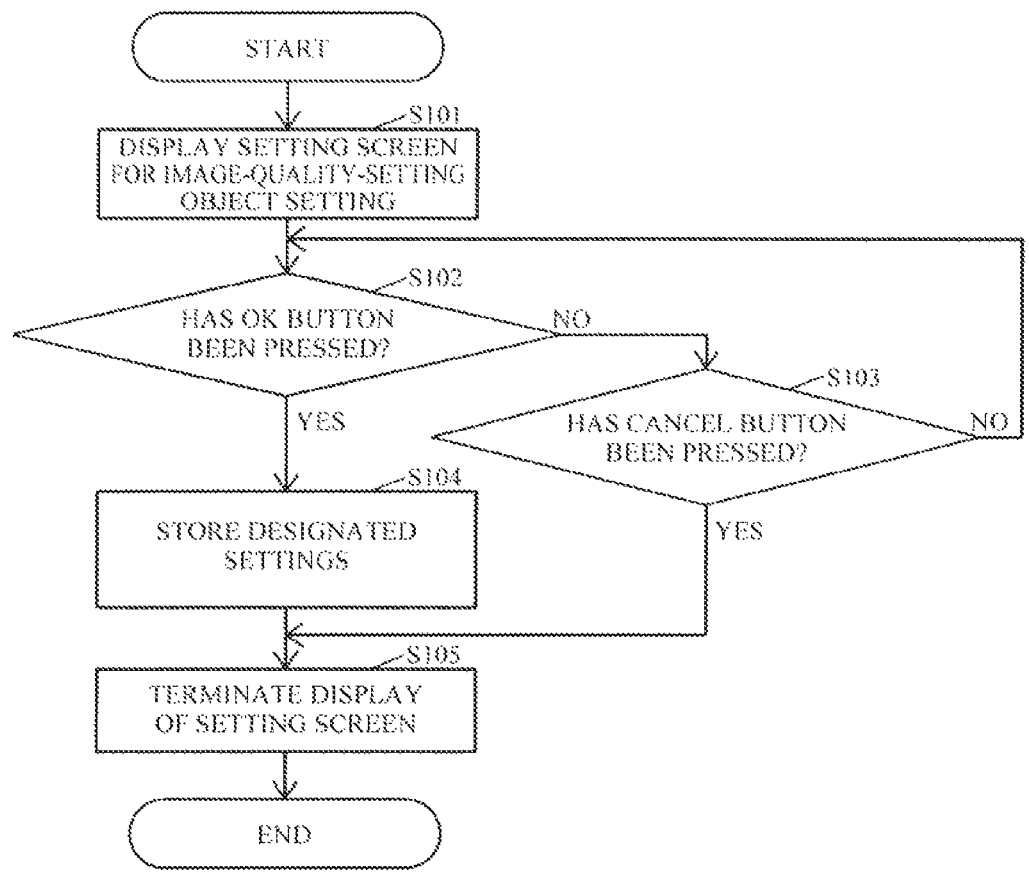
FIG. 4 shows an operating procedure of the MFP for an image-quality-setting object setting.

If an instruction to perform the image-quality-setting object setting 27*d* is inputted via the operation device 21, the control device 28 of the MFP 20 executes the operation shown in FIG. 4.

FIG. 4 shows an operating procedure of the MFP 20 for the image-quality-setting object setting 27*d*.

As shown in FIG. 4, the designation reception section 28*h* of the control device 28 of the MFP 20 causes the display device 22 to display a setting screen 40 (see FIG. 5) for the image-quality-setting object setting 27*d* (S101).

Figure 5:
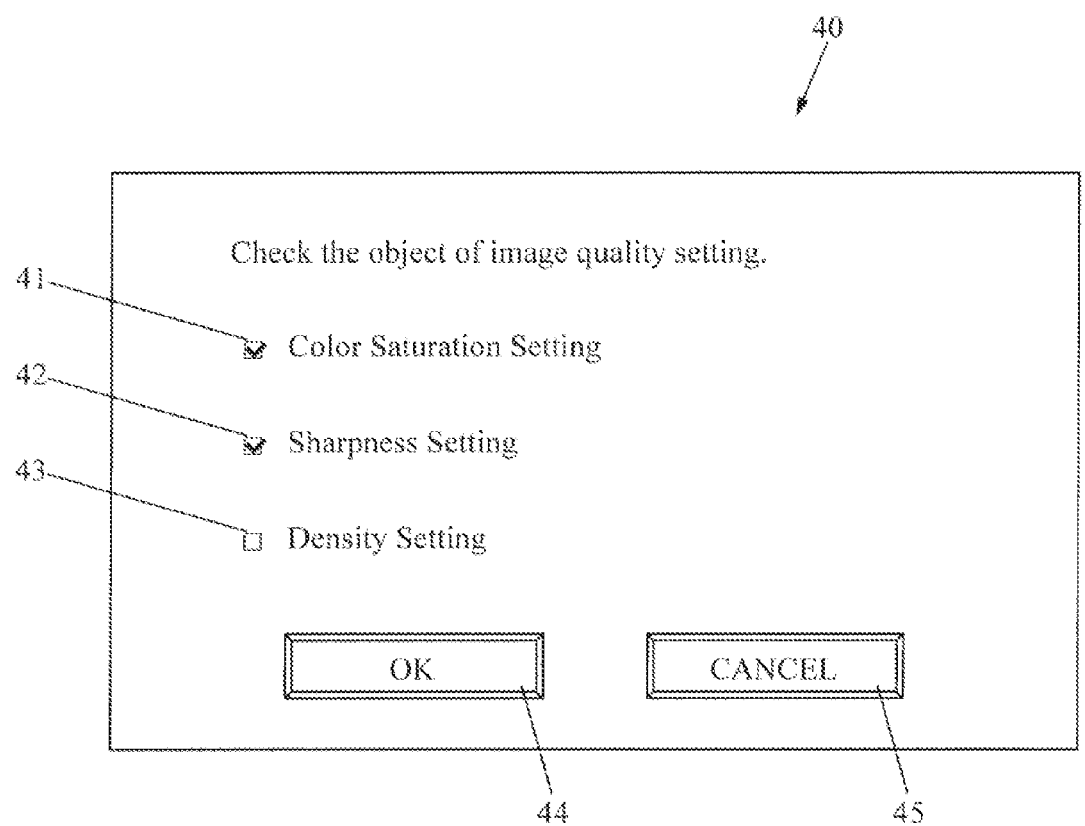
FIG. 5 shows an example of a setting screen for the image-quality-setting object setting.

FIG. 5 shows an example of the setting screen 40 for the image-quality-setting object setting 27*d*.

The setting screen 40 shown in FIG. 5 includes, of the settings on the MFP 20: a check box 41 for designating a setting on the color saturation of an image; a check box 42 for designating a setting on sharpness for adjusting the sharpness of the outline of the image; a check box 43 for designating a setting on the density of the image; an OK button 44 for determining the settings designated in the check boxes 41 to 43; and a cancel button 45 for cancelling the settings of the image-quality-setting object setting 27*d*. In the example shown in FIG. 5, the check boxes 41 and 42 are designated, and thus, the values of color saturation and sharpness are set as being settable, and the value of density is set as being unsettable in the image-quality-setting object setting 27*d*. In other words, color saturation and sharpness are the objects of image-quality setting. In the example shown in FIG. 5, settings on color saturation, sharpness, and density can be designated; alternatively, part of these settings need not be designated, and among settings on the MFP 20, any other settings on the image quality of printing may be designated.

As shown in FIG. 4, after the process in S101, the designation reception section 28*h* determines whether the OK button 44 has been pressed (S102).

If it is determined in S102 that the OK button 44 has not been pressed, the designation reception section 28*h* determines whether the cancel button 45 has been pressed (S103).

If it is determined in S103 that the cancel button 45 has not been pressed, the designation reception section 28*h* returns to the process in S102.

If it is determined in S102 that the OK button 44 has been pressed, the designation reception section 28*h* stores the settings designated in the check boxes 41 to 43 in the storage device 27 as the image-quality-setting object setting 27*d* (S104).

After executing the process in S104 or if it is determined in S103 that the cancel button 45 has been pressed, the designation reception section 28*h* terminates the display of the setting screen 40 for the image-quality-setting object setting 27*d* on the display device 22 (S105) and terminates the operation shown in FIG. 4.

The above description is made for the situation where operations are inputted to the MFP 20 via the operation device 21 of the MFP 20. This is similar to another embodiment in which operations are inputted to the MFP 20 by the operation device 31 of the computer 30 via the network 11 except that the setting screen 40 is displayed not on the display device 22 of the MFP 20 but on the display device 32 of the computer 30.

Next, an operation of the MFP 20 for setting the intermittent-operation print count 27*e* will be described.

Figure 6:
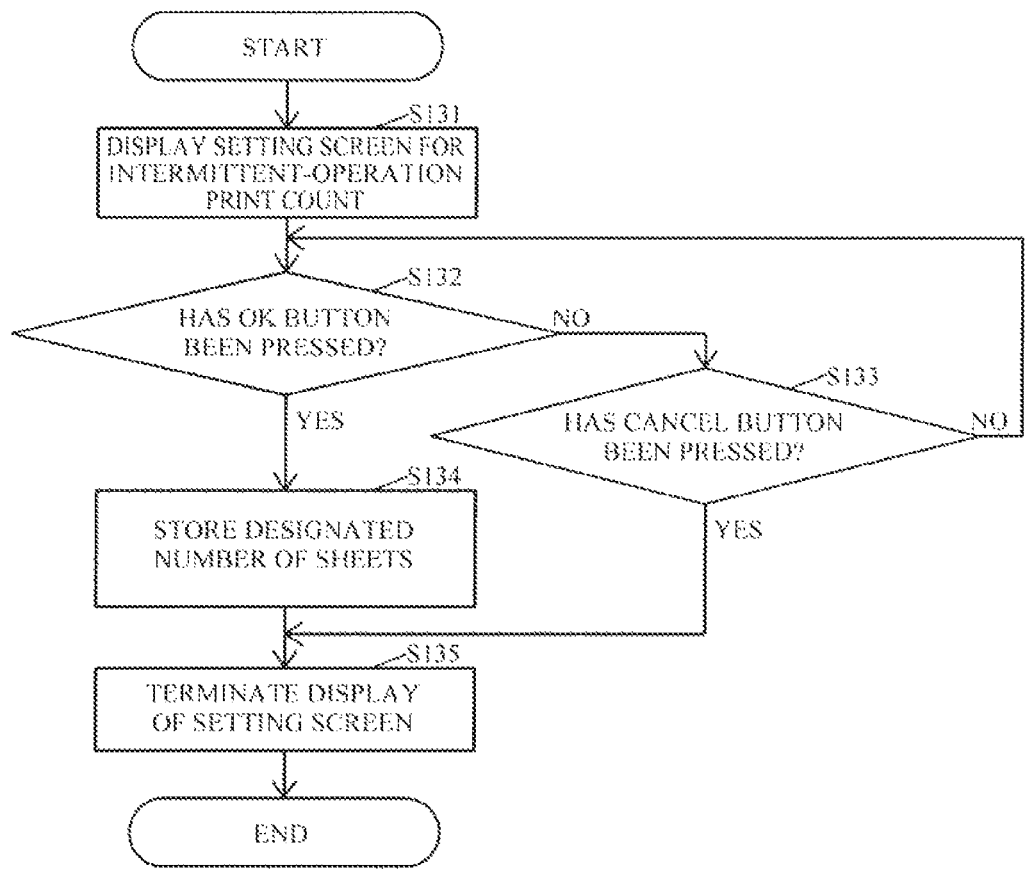
FIG. 6 shows an operating procedure of the MFP for setting an intermittent-operation print count.

If an instruction to set the intermittent-operation print count 27*e* is inputted via the operation device 21, the control device 28 of the MFP 20 executes the operation shown in FIG. 6.

FIG. 6 shows an operating procedure of the MFP 20 for setting the intermittent-operation print count 27*e*.

As shown in FIG. 6, the count-setting reception section 28*i* of the control device 28 of the MFP 20 causes the display device 22 to display a setting screen 50 (see FIG. 7) for the intermittent-operation print count 27*e* (S131).

Figure 7:
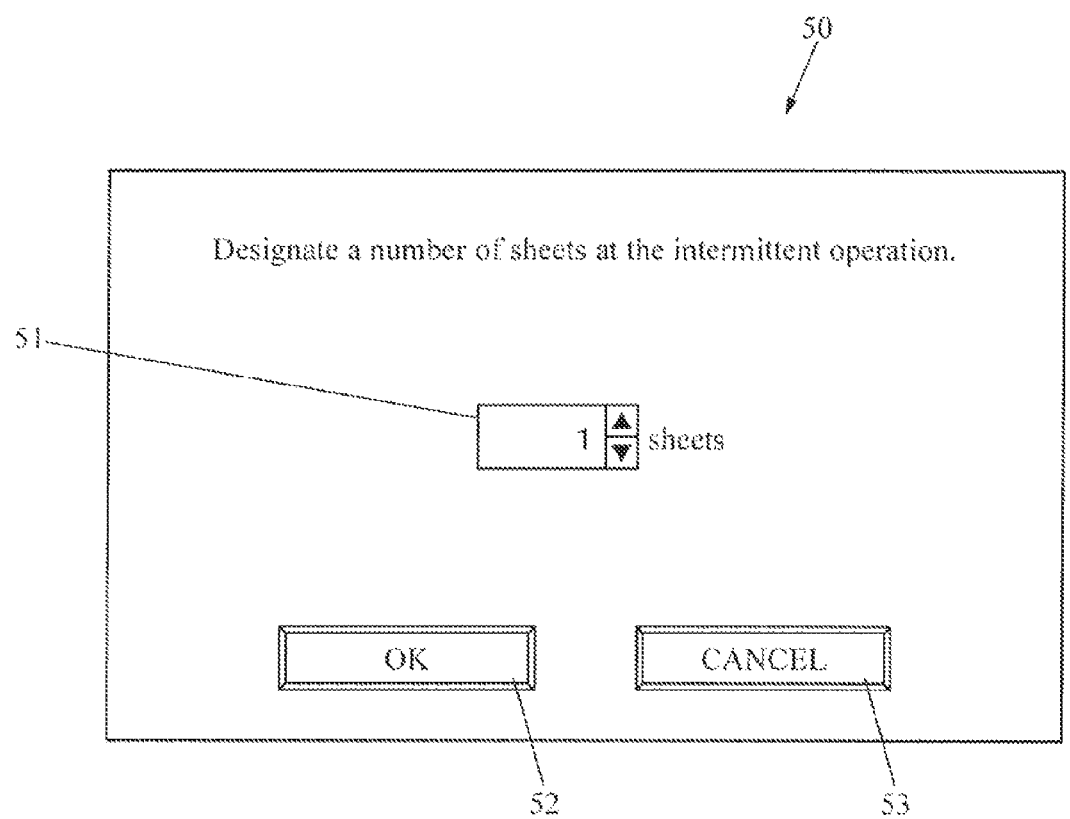
FIG. 7 shows an example of a setting screen for the intermittent-operation print count.

FIG. 7 shows an example of the setting screen 50 for the intermittent-operation print count 27*e*.

The setting screen 50 shown in FIG. 7 includes a spin box 51 for designating the number of sheets to be printed, an OK button 52 for deciding the number of sheets designated in the spin box 51, and a cancel button 53 for cancelling the setting on the intermittent-operation print count 27*e*.

As shown in FIG. 6, after the process in S131, the count-setting reception section 28*i* determines whether the OK button 52 has been pressed (S132).

If it is determined in S132 that the OK button 52 has not been pressed, the count-setting reception section 28*i* determines whether the cancel button 53 has been pressed (S133).

If it is determined in S133 that the cancel button 53 has not been pressed, the count-setting reception section 28*i* returns to the process in S132.

If it is determined in S132 that the OK button 52 has been pressed, the count-setting reception section 28*i* stores the number of sheets designated in the spin box 51 in the storage device 27 as the intermittent-operation print count 27*e* (S134).

After executing the process of S134 or if it is determined in S133 that the cancel button 53 has been pressed, the count-setting reception section 28*i* terminates the display of the setting screen 50 for the intermittent-operation print count 27*e* on the display device 22 (S135) and terminates the operation shown in FIG. 6.

The above description is for the situation where operations are inputted to the MFP 20 via the operation device 21 of the MFP 20. This is similar to another embodiment in which operations are inputted to the MFP 20 by the operation device 31 of the computer 30 via the network 11 except that the setting screen 50 is displayed not on the display device 22 of the MFP 20 but on the display device 32 of the computer 30.

Next, an operation of the MFP 20 for setting the receiving condition for determination 27*f* will be described.

Figure 8:
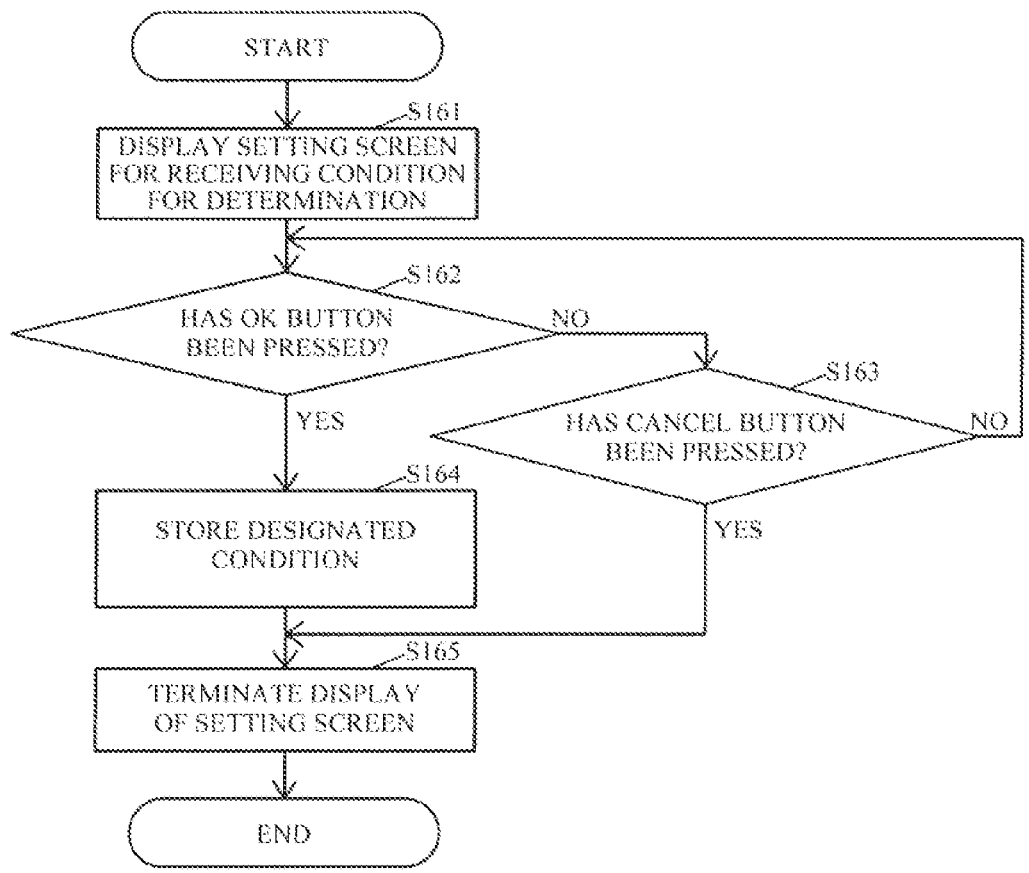
FIG. 8 shows an operating procedure of the MFP for setting a receiving condition for determination.

If an instruction to set the receiving condition for determination 27*f* is inputted via the operation device 21, the control device 28 of the MFP 20 executes the operation shown in FIG. 8.

FIG. 8 shows an operating procedure of the MFP 20 for setting the receiving condition for determination 27*f*.

As shown in FIG. 8, the control device 28 of the MFP 20 causes the display device 22 to display a setting screen 60 (see FIG. 9) for the receiving condition for determination 27*f* (S161).

Figure 9:
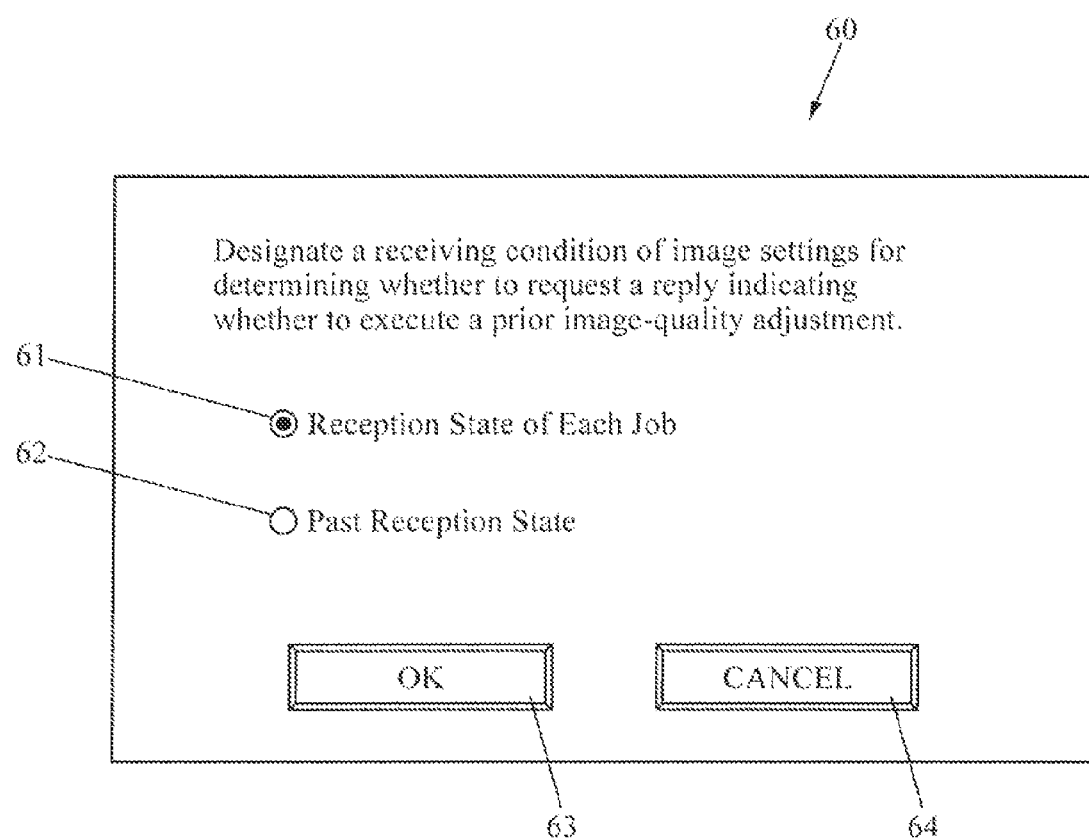
FIG. 9 shows an example of a setting screen for the receiving condition for determination.

FIG. 9 shows an example of the setting screen 60 for the receiving condition for determination 27*f*.

The setting screen 60 shown in FIG. 9 includes a radio button 61 for designating "Reception State of Each Job" as the receiving condition for determination 27*f*, a radio button 62 for designating "Past Reception State" as the receiving condition for determination 27*f*, an OK button 63 for determining a condition designated by the radio button 61 or the radio button 62; and a cancel button 64 for cancelling the setting on the receiving condition for determination 27*f*. Note that only one of the radio button 61 and the radio button 62 is commonly selected.

As shown in FIG. 8, after the process in S161, the control device 28 determines whether the OK button 63 has been pressed (S162).

If it is determined in S162 that the OK button 63 has not been pressed, the control device 28 determines whether the cancel button 64 has been pressed (S163).

If it is determined in S163 that the cancel button 64 has not been pressed, the control device 28 returns to the process in S162.

If it is determined in S162 that the OK button 63 has been pressed, the control device 28 stores a condition designated in one of the radio button 61 and the radio button 62 in the storage device 27 as the receiving condition for determination 27f (S164).

After executing the process in S164 or if it is determined in S163 that the cancel button 64 has been pressed, the control device 28 terminates the display of the setting screen 60 for the receiving condition for determination 27f on the display device 22 (S165) and terminates the operation shown in FIG. 8.

The above description is for the situation where operations are inputted to the MFP 20 via the operation device 21 of the MFP 20. This is similar to another embodiment in which operations are inputted to the MFP 20 by the operation device 31 of the computer 30 via the network 11 except that the setting screen 60 is displayed not on the display device 22 of the MFP 20 but on the display device 32 of the computer 30.

Next, an operation of the MFP 20 for executing the normal image-quality adjustment will be described.

Figure 10:
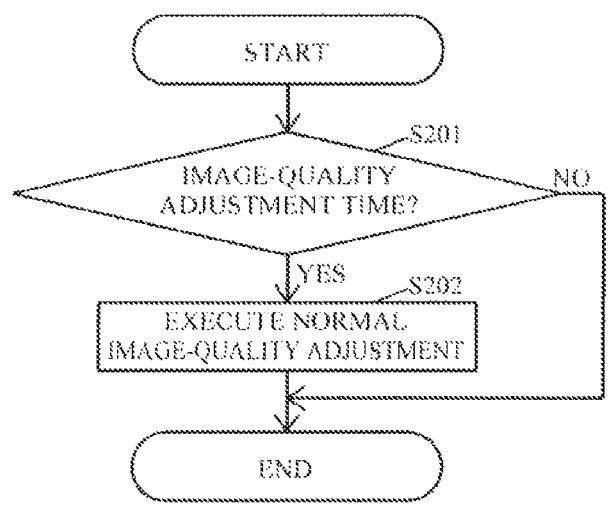
FIG. 10 shows an operating procedure of the MFP for executing a normal image-quality adjustment.

The control device 28 of the MFP 20 executes the operation shown in FIG. 10 before printing every time one sheet is printed.

FIG. 10 shows an operating procedure of the MFP 20 for executing the normal image-quality adjustment.

As shown in FIG. 10, the image-quality-adjustment execution section 28c of the control device 28 of the MFP 20 determines whether the present time is the image-quality adjustment time to execute the normal image-quality adjustment (S201). The image-quality-adjustment execution section 28c determines that the present time is the image-quality adjustment time when the MFP 20 is in a primary state in which the normal image-quality adjustment is to be performed. Examples of the primary state may include a state in which a sensor value measured by a sensor (not shown) for determining the image quality of printing of the MFP 20 has reached a specific value as a primary level and a state in which the number of sheets printed by the MFP 20 after execution of the preceding image-quality adjustment on the MFP 20 has reached a specific number as a primary level.

If it is determined in S201 that the present time is the image-quality adjustment time, the image-quality-adjustment execution section 28c executes the normal image-quality adjustment (S202) and terminates the operation shown in FIG. 10.

In contrast, if it is determined in S201 that the present time is not the image-quality adjustment time, the image-quality-adjustment execution section 28c terminates the operation shown in FIG. 10 without executing the normal image-quality adjustment.

Next, an operation of the MFP 20 for executing a job will be described.

If the user inputs a user ID and a password via the operation device 31 of the computer 30 to instruct the computer 30 to perform printing with the MFP 20 while the control device 35 of the computer 30 implements the printer driver 34a, the control device 35 transmits print data including the user ID and the password to the MFP 20 via the network communication device 33. For the print instruction, the user can perform settings on the image quality of printing, such as set color saturation, set sharpness, and set density. The control device 35 of the computer 30 adds the settings on the image quality of printing included in the print instruction to the print data.

Figure 11:
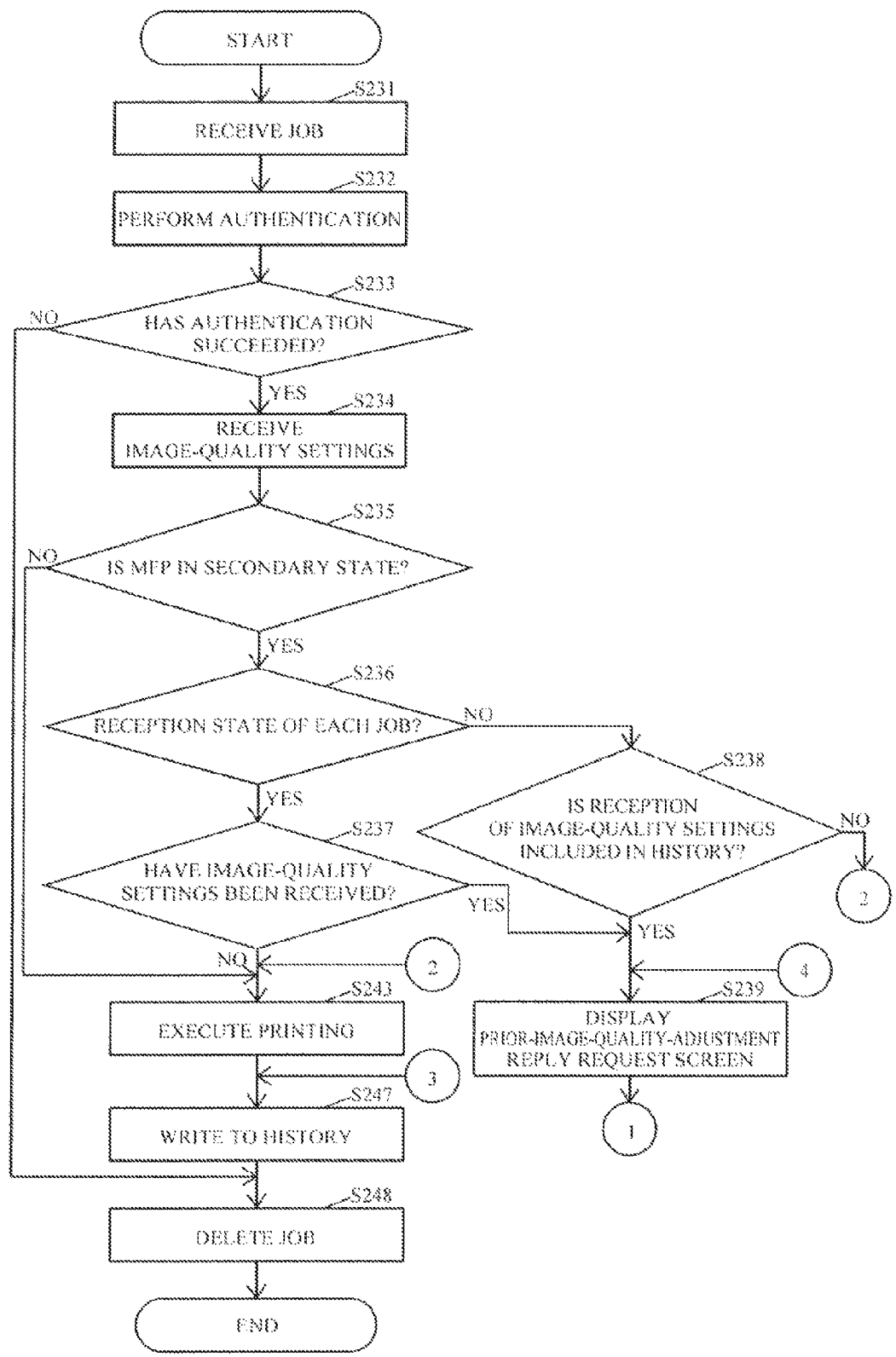
FIG. 11 shows an operating procedure of the MFP for executing a job.
Figure 12:
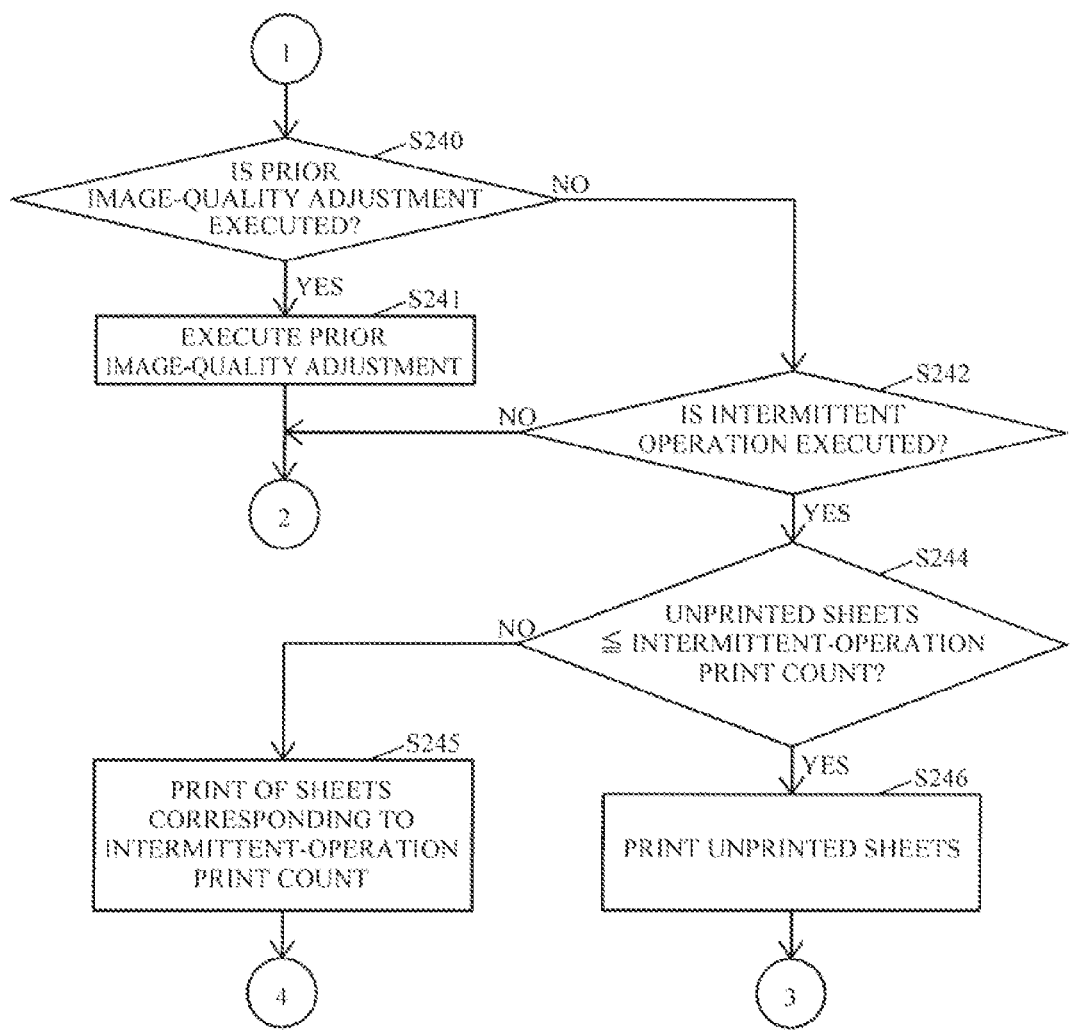
FIG. 12 is an operating procedure for the continuance of FIG. 11.

Upon receiving the print data via the network communication device 25, the control device 28 of the MFP 20 executes the operation shown in FIGS. 11 and 12.

FIG. 11 shows an operating procedure of the MFP 20 for executing a job. FIG. 12 is an operating procedure for the continuance of FIG. 11.

As shown in FIGS. 11 and 12, the job receiving section 28b of the control device 28 of the MFP 20 receives a job corresponding to the print data received via the network communication device 25 (S231).

Next, the authentication section 28f of the control device 28 performs authentication of the user based on the user ID and the password included in the print data on the job received in S231 (S232). If the combination of the user ID and the password included in the print data on the job received in S231 is included in the user information 27b stored in the storage device 27, the authentication section 28f determines that the user authentication has succeeded.

Next, the authentication section 28f determines whether the authentication in S232 has succeeded (S233).

If it is determined in S233 that the authentication has succeeded, the image-quality-setting receiving section 28d of the control device 28 receives the image-quality settings included in the print data on the job received in S231 (S234). Here, the image-quality-setting receiving section 28d determines which of the settings included in the print data on the job received in S231 are the image-quality settings based on the image-quality-setting object setting 27d in the storage device 27.

Next, the reply request section 28e of the control device 28 determines whether the MFP 20 is in a secondary state before the image-quality adjustment time (S235). If the state of the MFP 20 has come close to the specific range of the primary state in which the normal image-quality adjustment is to be performed, the reply request section 28e determines that the MFP 20 is in the secondary state before the image-quality adjustment time. For example, assuming that the primary state indicates that the sensor value for determining the image quality of printing of the MFP 20 has reached the primary level, the secondary state indicates that the sensor value has not reached the primary level, but has reached a secondary level other than the primary level. Assuming that the primary state indicates that the number of sheets printed by the MFP 20 after execution of the preceding image-quality adjustment on the MFP 20 has reached the primary level, for example, 100 sheets, the secondary state indicates that the number of sheets printed by the MFP 20 after execution of the preceding image-quality adjustment on the MFP 20 has not reached the primary level, but has reached the secondary level other than the primary level, for example, 80 sheets. Note that the sensor value and the number of sheets reach the secondary level before the primary level.

If it is determined in S235 that the MFP 20 is in the secondary state before the image-quality adjustment time, the reply request section 28e determines whether the receiving condition for determination 27f in the storage device 27 is "Reception State of Each Job" (S236).

If it is determined in S236 that the receiving condition for determination 27f in the storage device 27 is "Reception State of Each Job", the reply request section 28e determines whether the image-quality settings on the job received in S231 have been received in S234 (S237). Here, if no image-quality settings are received in S234, the reply request section 28*e* determines that no image-quality settings on the job received in S231 have been received in S234.

In contrast, if it is determined in S236 that the receiving condition for determination 27*f* in the storage device 27 is not "Reception State of Each Job", that is, the receiving condition is "Past Reception State", the reply request section 28*e* determines whether the reception of the image-quality settings performed by the user authenticated in S232 is included in the history 27*c* in the storage device 27 (S238). Here, if a combination of the user authenticated in S232 and the image-quality settings is stored in the history 27*c* in the storage device 27, the reply request section 28*e* determines that the reception of the image-quality settings performed by the user authenticated in S232 is included in the history 27*c* in the storage device 27.

If it is determined in S237 that (i) the image-quality settings on the job received in S231 have been received in S234 or if it is determined in S238 that (ii) reception of the image-quality settings performed by the user authenticated in S232 is included in the history 27*c* in the storage device 27, the reply request section 28*e* causes the display device 32 of the computer 30 to display a prior-image-quality-adjustment-reply request screen 70 (see FIG. 13) for requesting a reply indicating whether to execute a prior image-quality adjustment (S239).

Figure 13:
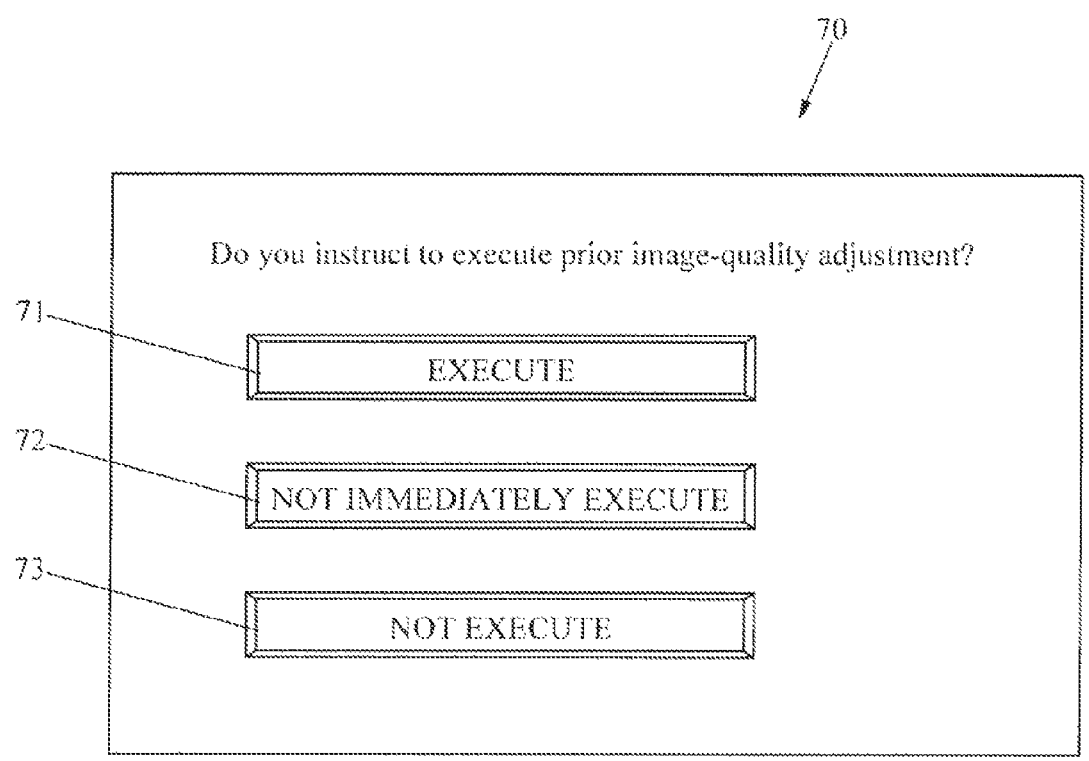
FIG. 13 shows an example of a prior-image-quality-adjustment-reply request screen.

FIG. 13 shows an example of the prior-image-quality-adjustment-reply request screen 70.

The prior-image-quality-adjustment-reply request screen 70 shown in FIG. 13 includes: a button 71 for executing the prior image-quality adjustment; a button 72 for not immediately executing the prior image-quality adjustment, that is, for executing the intermittent operation; and a button 73 for not executing the prior image-quality adjustment.

As shown in FIGS. 11 and 12, the reply request section 28*e* of the control device 28 determines whether to execute the prior image-quality adjustment (S240). If the button 71 is pressed on the prior-image-quality-adjustment-reply request screen 70 via the operation device 31 of the computer 30, the reply request section 28*e* determines to execute the prior image-quality adjustment. If the button 72 or the button 73 is pressed on the prior-image-quality-adjustment-reply request screen 70 via the operation device 31 of the computer 30, the reply request section 28*e* determines not to execute the prior image-quality adjustment.

If it is determined in S240 that the prior image-quality adjustment is to be executed, the image-quality-adjustment execution section 28*c* of the control device 28 executes the prior image-quality adjustment (S241).

If it is determined in S240 not to execute the prior image-quality adjustment, the reply request section 28*e* of the control device 28 determines whether to execute the intermittent operation (S242). If the button 72 is pressed on the prior-image-quality-adjustment-reply request screen 70 via the operation device 31 of the computer 30, the reply request section 28*e* determines to execute the intermittent operation. If the button 73 is pressed on the prior-image-quality-adjustment-reply request screen 70 via the operation device 31 of the computer 30, the reply request section 28*e* determines not to execute the intermittent operation.

If: (i) it is determined in S235 that the MFP 20 is in the secondary state before the image-quality adjustment time, (ii) if it is determined in S237 that the image-quality settings on the job received in S231 have not been received in S234, (iii) if it is determined in S238 that reception of the image-quality settings performed by the user authenticated in S232 is not included in the history 27*c* of the storage device 27, (iv) after the process in S241 has been executed, or (v) if it is determined in S242 not to execute the intermittent operation, the printing execution section 28*a* of the control device 28 executes printing of an image on a recording medium with the printer 23 based on the print data on the job received in S231 (S243).

If it is determined in S242 to execute the intermittent operation, the printing execution section 28*a* determines whether the number of sheets not printed in the job received in S231 is equal to or less than the intermittent-operation print count 27*e* in the storage device 27 (S244).

If it is determined in S244 that the number of sheets not printed is not equal to or less than the intermittent-operation print count 27*e*, the printing execution section 28*a* executes printing of sheets corresponding to the intermittent-operation print count 27*e* among the sheets not printed in the job received in S231 (S245) and causes the display device 32 of the computer 30 to display the prior-image-quality-adjustment-reply request screen 70 (S239).

If it is determined in S244 that the number of sheets not printed is equal to or less than the intermittent-operation print count 27*e*, the printing execution section 28*a* executes printing of the sheets not printed in the job received in S231 (S246).

After the process of S243 or the process of S246 has been executed, the history management section 28*g* of the control device 28 writes the combination of the user authenticated in S232 and the image-quality settings received in S234 to the history 27*c* in the storage device 27 (S247).

If it is determined in S233 that the authentication has failed or after the process of S247 ends, the job receiving section 28*b* of the control device 28 deletes the job received in S231 (S248) and terminates the operation shown in FIGS. 11 and 12.

The above description is made for the situation where the MFP 20 executes the job based on print data transmitted from the computer 30. This is similar to another embodiment in which the MFP 20 executes the job, such as a copying job, requested via the operation device 21 of the MFP 20 except that user's operation is inputted not to the operation device 31 of the computer 30 but to the operation device 21 of the MFP 20 and that the prior-image-quality-adjustment-reply request screen 70 is displayed not on the display device 32 of the computer 30 but on the display device 22 of the MFP 20.

As described above, upon receiving the job (S231), if the present time has come close to the image-quality adjustment time to execute the normal image-quality adjustment (YES in S235), the MFP 20 requests the reply indicating whether to execute the prior image-quality adjustment when the specific condition for reception of image-quality settings, that is, the receiving condition for determination 27*f*, is satisfied (S236 to S239). Thus, the MFP 20 allows the user who places great importance on the image quality (YES in S237 or YES in S238) to select whether to execute the prior image-quality adjustment (S240). Furthermore, the MFP 20 allows the user who places little importance on the image quality (NO in S237 or NO in S238) to execute the job without executing the prior image-quality adjustment. In other words, the MFP 20 can execute the image-quality adjustment at an appropriate time.

If receiving image-quality settings when executing the job (YES in S237), the MFP 20 requests the reply indicating whether to execute the prior image-quality adjustment (S239). Thus, the MFP 20 allows the user to select whether to execute the prior image-quality adjustment on the job in which the user places a great importance on the image quality (YES in S237) (S240). Furthermore, the MFP 20 can execute the job in which the user places little importance on the image quality (NO in S237) without executing the prior image-quality adjustment. In other words, the MFP 20 can execute the image-quality adjustment at an appropriate time depending on the importance the user places on the image quality of individual jobs.

Furthermore, if the MFP 20 has received image-quality settings from the user who requested the job (YES in S238), the MFP 20 requests the reply indicating whether to execute the prior image-quality adjustment (S239) when executing the job. Thus, even if the MFP 20 has not received image-quality settings on the job, the MFP 20 allows the user who places great importance on the image quality (YES in S238) to select whether to execute the prior image-quality adjustment (S240). Furthermore, for the user who places little importance on the image quality (NO in S238), the MFP 20 can execute the job without executing the prior image-quality adjustment. In other words, the MFP 20 can execute the image-quality adjustment at an appropriate time depending on the user's importance on the image quality.

After executing printing of the intermittent-operation print count 27e of the job (S245), the MFP 20 requests the reply indicating whether to execute the prior image-quality adjustment (S239). Thus, the MFP 20 allows the user to select whether to execute the prior image-quality adjustment after the user actually checks the result of printing.

Of the settings on the MFP 20, the MFP 20 receives designation of image-quality settings (S104). Thus, the MFP 20 can change the details of the image-quality settings serving as a reference for requesting the reply indicating whether to execute the prior image-quality adjustment (S237 and S238) depending on user preference.

The MFP 20 receives the setting on the intermittent-operation print count 27e (S134). Thus, the MFP 20 can change the number of sheets with which the user checks the result of printing (S245) depending on user preference.

If the receiving condition for determination 27f in the storage device 27 is "Past Reception State" (NO in S236), the MFP 20 displays the prior-image-quality-adjustment-reply request screen 70 (S239) using the determination criterion that reception of image-quality settings performed by the user authenticated in S232 is included in the history 27c in the storage device 27 (S238). In another embodiment, the MFP 20 may display the prior-image-quality-adjustment-reply request screen 70 using not only the determination criterion that, if the receiving condition for determination 27f in the storage device 27 is "Past Reception State" (NO in S236), the determination criterion that reception of image-quality settings performed by the user authenticated in S232 is included in the history 27c in the storage device 27, but also the determination criterion that image-quality settings on the job received in S231 are received in S234.

The MFP 20 writes only image-quality settings among settings included in the print data on the job received in S231 to the history 27c (S247). In another embodiment, the MFP 20 may have all the settings included in the print data on the job received in S231 to the history 27c. In this case, if the combination of the user authenticated in S232 and image-quality settings based on the image-quality-setting object setting 27d in the storage device 27 is stored in the history 27c of the storage device 27, the MFP 20 may determine in S238 that reception of the image-quality settings performed by the user authenticated in S232 is included in the history 27c in the storage device 27.

If the receiving condition for determination 27f in the storage device 27 is "Past Reception State" (NO in S236), and if even one time of reception of the image-quality settings performed by the user authenticated in S232 is included in the history 27c in the storage device 27 (YES in S238), the MFP 20 displays the prior-image-quality-adjustment-reply request screen 70 (S239). In another embodiment, if the receiving condition for determination 27f in the storage device 27 is "Past Reception State" (NO in S236), and if the fact that the image-quality settings performed by the user authenticated in S232 are received at a frequency higher than a specific reference is included in the history 27c of the storage device 27, the MFP 20 may display the prior-image-quality-adjustment-reply request screen 70.

The MFP 20 sets the intermittent-operation print count 27e before the series of job executing operations (see FIGS. 11 and 12) (S134). In another embodiment, the MFP 20 may set the intermittent-operation print count 27e on the prior-image-quality-adjustment-reply request screen 70 displayed in S239 of the job executing operations (see FIGS. 11 and 12).

Although the image forming apparatus according to the embodiments of the present disclosure is an MFP, it may be an image forming apparatus other than the MFP, such as a dedicated printer and a dedicated copying machine.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus comprising:
   a job receiving unit that receives a job for executing printing;
   an image-quality-adjustment execution unit that executes a normal image-quality adjustment at an image-quality adjustment time and a prior image-quality adjustment before the image-quality adjustment time, for maintaining the image quality of the printing;
   an image-quality-setting receiving unit that receives an image-quality setting that is included in print data on the job received by the job receiving unit, wherein the image-quality setting has a value on the image quality of the printing;
   a reply request unit that requests, in a specific state before the image-quality adjustment time since the job is received by the job receiving unit, a reply indicating whether to execute a prior image-quality adjustment if a specific condition for the reception of the image-quality setting by the image-quality-setting receiving unit is satisfied; and
   a printing execution unit that prints, if the reply indicates that the prior image-quality adjustment is to be executed, an image on a recording medium by executing the job after the image-quality-adjustment execution unit executes the prior image-quality adjustment,
   wherein the image-quality-setting receiving unit executes the normal image-quality adjustment and the prior image-quality adjustment while the printing execution unit does not print the image on the recording medium, and
   wherein the specific condition is that the image-quality setting is received on the received job or in a history.

2. The image forming apparatus according to claim 1, wherein
   the specific condition is that the image-quality setting on the job is received by the image-quality-setting receiving unit.

3. The image forming apparatus according to claim 1 comprising:
- an authentication unit that authenticates a user;
- a history management unit that manages the history of reception of the image-quality setting by the image-quality-setting receiving unit for each user; and
- wherein the specific condition is that the fact that the image-quality setting performed by the user authenticated by the authentication unit is received at a frequency higher than a specific reference is included in the history.

4. The image forming apparatus according to claim 1, further comprising:
- a designation reception unit that receives a setting for designating the object of the image-quality setting among settings on the image forming apparatus.

5. The image forming apparatus according to claim 1, wherein:
- the printing execution unit is executes, if the reply indicates that a specific number of sheets are to be printed without executing the prior image-quality adjustment, printing of the specific number of sheets in the job; and
- the reply request unit requests the reply again after the printing execution unit executes printing of the specific number of sheets.

6. The image forming apparatus according to claim 5, comprising:
- a count-setting reception unit that receives a setting on the specific number of sheets.

7. The image forming apparatus according to claim 1, wherein the specific state indicates that a value for determining the image quality of printing has not reached a primary level, but has reached a secondary level other than the primary level.

8. The image forming apparatus according to claim 1, wherein the specific state indicates that the number of sheets printed after execution of a preceding image-quality adjustment has not reached a primary level, but has reached a secondary level other than the primary level.

9. A method for forming an image, comprising:
- receiving, via a job receiving unit, a job for executing printing;
- executing, via an image-quality-adjustment execution unit, a normal image-quality adjustment at an image-quality adjustment time and a prior image-quality adjustment before the image-quality adjustment time, for maintaining image quality of the printing;
- receiving, via an image-quality-setting receiving unit, an image-quality setting that is included in print data on the job received by the job receiving unit, wherein the image-quality setting has a value on the image quality of the printing;
- in a specific state before the image-quality adjustment time since the job is received by the job receiving unit, requesting, via a reply request unit, a reply indicating whether to execute a prior image-quality adjustment if a specific condition for the reception of the image-quality setting by the image-quality-setting receiving unit is satisfied; and
- if the reply indicates that the prior image-quality adjustment is to be executed, printing, via a printing execution unit, an image on a recording medium by executing the job after the image-quality-adjustment execution unit executes the prior image-quality adjustment,
- wherein the image-quality-setting receiving unit executes the normal image-quality adjustment and the prior image-quality adjustment while the printing execution unit does not print the image on the recording medium, and
- wherein the specific condition is that the image-quality setting is received on the received job or in a history.

10. A non-transitory, computer-readable recording medium storing an image forming program that is executable by a computer of an image forming apparatus, the image forming program comprising:
- a first program code for causing the computer to receive a job for executing printing;
- a second program code for causing the computer to execute a normal image-quality adjustment at an image-quality adjustment time and a prior image-quality adjustment before the image-quality adjustment time, for maintaining image quality of the printing;
- a third program code for causing the computer to receive an image-quality setting that is included in print data on the job, wherein the image-quality setting has a value on the image quality of the printing;
- a fourth program code for causing the computer, in a specific state before the image-quality adjustment time since the job is received, to request a reply indicating whether to execute a prior image-quality adjustment if a specific condition for the reception of the image-quality setting is satisfied; and
- a fifth program code for causing the computer, if a reply indicates that the prior image-quality adjustment is to be executed, to print an image on a recording medium by executing the job after the image-quality-adjustment execution unit executes the prior image-quality adjustment,
- wherein the second program code causes the computer to execute the normal image-quality adjustment and the prior image-quality adjustment while the image is not printed on the recording medium by the fifth program code, and
- wherein the specific condition is that the image-quality setting is received on the received job or in a history.

* * * * *